(12) United States Patent
Bracho et al.

(10) Patent No.: US 7,447,673 B2
(45) Date of Patent: Nov. 4, 2008

(54) ENTERPRISE COMPUTER SYSTEM

(75) Inventors: Rafael Bracho, Cupertino, CA (US); Steven M. Jankowski, Mountain View, CA (US)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 11/416,313

(22) Filed: May 3, 2006

(65) Prior Publication Data

US 2006/0200444 A1    Sep. 7, 2006

Related U.S. Application Data

(63) Continuation of application No. 09/464,378, filed on Dec. 15, 1999, now Pat. No. 7,143,093.

(60) Provisional application No. 60/112,636, filed on Dec. 17, 1998.

(51) Int. Cl.
*H04L 9/00* (2006.01)
*G06F 9/00* (2006.01)
(52) U.S. Cl. .................... 707/1; 713/150; 713/151
(58) Field of Classification Search ............ 713/150, 713/151; 707/1
See application file for complete search history.

(56) References Cited

U.S. PATENT DOCUMENTS 6,633,878 B1   10/2003   Underwood
6,636,855 B2   10/2003   Holloway et al.
6,640,244 B1   10/2003   Bowman-Amuah

OTHER PUBLICATIONS http://www.networkcomputing.com/713/713f2BRANCHO.html, year 1996.*
http://calpolynews.calpoly.edu/news_releases/2002/2002_news_releases/02archives_general/engineeralum.html, year 2002.*
A framework for secure enterprise computing Kang, M.H.; Froscher, J.N.; Enabling Technologies: Infrastructure for Collaborative Enterprises, 2000. (Wet Ice 2000). Proeedings. IEEE 9th International Workshops on Jun. 14-16, 2000 pp. 219-220.*
Agent-Based Service-Oriented Computing and Applications Weiming Shen; Hamada Ghenniwa; Yinsheng Li; Pervasive Computing and Applications, 2006 1st International Symposium on Aug. 3-5, 2006 pp. 8-9.*
A Context, Rule and Role-Based Access Control Model In Enterprise Pervasive Computing Environment Xianzhi Huang; Haiyang Wang; Zhenxiang Chen; Jinjiao Lin; Pervasive Computing and Applications, 2006 1st International Symposium on Aug. 3-5, 2006 pp. 497-502.*

(Continued)

*Primary Examiner*—David Jung
(74) *Attorney, Agent, or Firm*—Sughrue Mion, PLLC

(57) ABSTRACT

A scalable enterprise computer system having the capability to provide transaction security as well as providing subscription filtering is described. As a method of transacting an event in the enterprise computer system a connection with an information broker by the publishe established after which it is determined if the event registered with the information broker. Next, a subscription corresponding to the registered event by a subscriber is accepted by the information broker, after which a platform neutral event is created that is then populated with event content which is then published to and received by the information broker.

7 Claims, 16 Drawing Sheets

OTHER PUBLICATIONS

Cugola et al., Exploiting an event-based infrastructure to develop complex distributed systems, Proceedings of the 1998 International Conference on Software Engineering Forging New Links, Apr. 19-25, 1998.

Bill Segall and David Arnold, Elvin has left the building, Proceedings of Aug. 1997, Online!, Sep. 1997.

Message Filtering Method, Research Disclosure, Industrial Opportunities LTD..Havant, GB, Oct. 1, 1998.

Bentley Select, The Client Server, Oct. 1998, p. 1-20, vol. 6-No. 10.

Abraham et al., Mapping enterprise events to the CORBA notification service, Enterprise Distributed Object Computing Conference 2000, EDOC 2000, Proceedings, Fourth International, Sep. 25-28, 2000, pp. 124-134.

Jafari et al., A distributed discrete event dynamic model for supply chain of business enterprises, Discrete Event Systems, 2002, Proceedings, Sixth International Workshop on Oct. 2-4, 2002, pp. 279-285.

Jie Meng et al., Achieving dynamic inter-organizational workflow management by integrating business processes, events and rules, System Sciences, 2002, HICSS, Proceedings of the 35th Annual Hawaii International Conference on Jan. 7-10, 2002, 10 pages.

* cited by examiner

ENTERPRISE COMPUTER SYSTEM

This is a continuation of application Ser. No. 09/464,378 filed Dec. 15, 1999 now U.S. Pat. No. 7,143,093, which claims benefit of Provisional Application No. 60/112,636 filed Dec. 17, 1998. The entire disclosures of the prior application, application Ser. Nos. 09/464,378 and 60/112,636 are hereby incorporated by reference.

BACKGROUND OF THE INVENTION

1. Field of the Invention

The present invention relates generally to the field of digital data processing systems, and more particularly to integrating the flow of information between a variety of computing tools in an enterprise computing environment.

2. Description of the Related Art

In modem enterprise computing environments, that is, computer systems for use in an office environment in a company, for example, a number of personal computers, workstations, mainframes, and the like along with other devices such as large mass storage subsystems, network interfaces, as well as interfaces to the public telephony systems may be interconnected to provide an integrated environment in which information may be shared among various users. Typically, users may be performing a variety of operations, including order receipt, manufacturing, shipping, billing, inventory control, and other operations in which sharing of data on a real time basis may provide a significant advantage over, for example, maintaining separate records and attempting to reconcile them later.

Several strategies have been developed to allow for sharing of information in an enterprise computing environment. One problem that arises in an enterprise computing environment is that often the various users are using programs which have been developed based on a data or programming model that assumes that the data they receive, process, and store will be unique to the program, which models often are convenient for the program developer for the particular type of operations performed by the program. However, in one strategy, all types of programs would be constrained to the same type data or programming model. There are several problems with this strategy. For example, all types of programs would be constrained to the same type data or programming model, which may be efficient for some types of programs but very inefficient for other types of programs. In addition, such a strategy would require all program developers to conform to a single data or programming model, which may reduce competitive advantages which developer's programs may be able to otherwise have if they would be able to use a data or programming model of their own choosing.

Another strategy is to provide an information exchange engine that can translate data between model's formats of various programs which may be used in the enterprise computing environment. While this will allow each program to have its own data or programming model, it may require acquiring and maintaining exchange engines for a number of programs and a user to select an appropriate exchange engine when importing or exporting information form another program. In addition, as the number of users and/or exchange engines increases in order to meet the needs of an expanding system, the interconnections between each of the components becomes prohibitively complex forming a "spaghetti like mass". This increase in complexity effectively limits the scalability of an integrated set of computer resources since any additional computer resources requires reconfiguring the entire system.

FIG. 1 is an illustration of a conventional enterprise computing system 100. The enterprise computing system 100 includes exchange engines 102-110 capable of accessing and cross connection of any number and type of information platforms 112 and 114. Such platforms include various database management systems, applications programs, large mass storage subsystems, network interfaces, as well as interfaces to the public telephony systems such as to the Internet. The database management applications generally include computer programs that are executed in conventional manner by digital computer systems. Typically, the exchange engines include computer programs executed by digital computer systems (which may be the same digital computer systems on which their respective applications programs are executed). The exchange engines and the application programs are processed and maintained on a number of digital computer systems interconnected by, for example, a network 116 which transfers data access requests, translated data access requests and responses between the computer systems on which the exchange engines and application programs are processed. As can be seen, as the enterprise computer system expands, the number of application programs and associated digital computer systems increase to meet the needs of the expanded enterprise computer system. This increase in the number of digital computers greatly increases the complexity of the network 116 which in turn greatly increases the resources required to maintain and upgrade the system 100.

Transaction security is also of paramount importance since users must be certain that all transactions carried out over the enterprise computer system are secure. By secure, it is meant that sensitive information, such as account numbers, account balances, passwords, etc. are safe from unauthorized users. Conventionally, enterprise computer systems have used various encryption type solutions to these problems. Unfortunately, although encryption type security measures can be useful in protecting information itself, providing transactional security is more problematic. By transactional security, it is meant that a subscriber, for example, is only able to receive events (authorized) of a specific security level, such as secret, or lower such as confidential. However, this same subscriber will not be authorized to receive higher level security, such as top secret.

In view of the foregoing, it would be advantageous and therefore desirable to have a scalable enterprise computer system having the capability to provide transaction security. In addition, the scalable enterprise computer system should also be capable of providing subscription filtering.

SUMMARY OF THE INVENTION

A scalable enterprise computer system having the capability to provide transaction security as well as providing subscription filtering is disclosed. As a method of transacting an event in the enterprise computer system, a connection between an information broker and an event publisher is established, the event to be published is then determined to be registered with the information broker. Next, if the registered event is indentified as being subscribed to by the subscriber, then the registered event is populated with event content. The populated event is then published to and received by the information broker.

In a preferred embodiment, only those received events that are determined by the information broker to be valid events are published an appropriate subscriber(s).

In another embodiment, an enterprise computer system is described. The enterprise computer system includes a publisher capable of publishing an event and an information broker validly coupled to the publisher arranged to receive the published event. The enterprise computer system further includes a content filter coupled to the information broker and a subscriber arranged to receive a properly subscribed to published event.

In a preferred embodiment, the information broker determines whether or not the received event is the properly subscribed to event by determining if an event type corresponding to the published event matches a subscription associated with the subscriber, whether or not an event security level corresponding to the event is verified, determining whether or not an event content matches the content filter, and whether or not an event authorization is valid. In those cases where the published event's type matches the subscription and when the event security level is verified, and when the event content matches the content filter, and when the event authorization is valid, then the event is the properly subscribed to event as determined by the information broker.

BRIEF DESCRIPTION OF THE DRAWINGS

The present invention is illustrated by way of example, and not by way of limitation, in the figures of the accompanying drawings, wherein like reference numerals refer to analogous or similar elements to facilitate ease of understanding, and in which.

DESCRIPTION OF THE PREFERRED EMBODIMENTS

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 1:
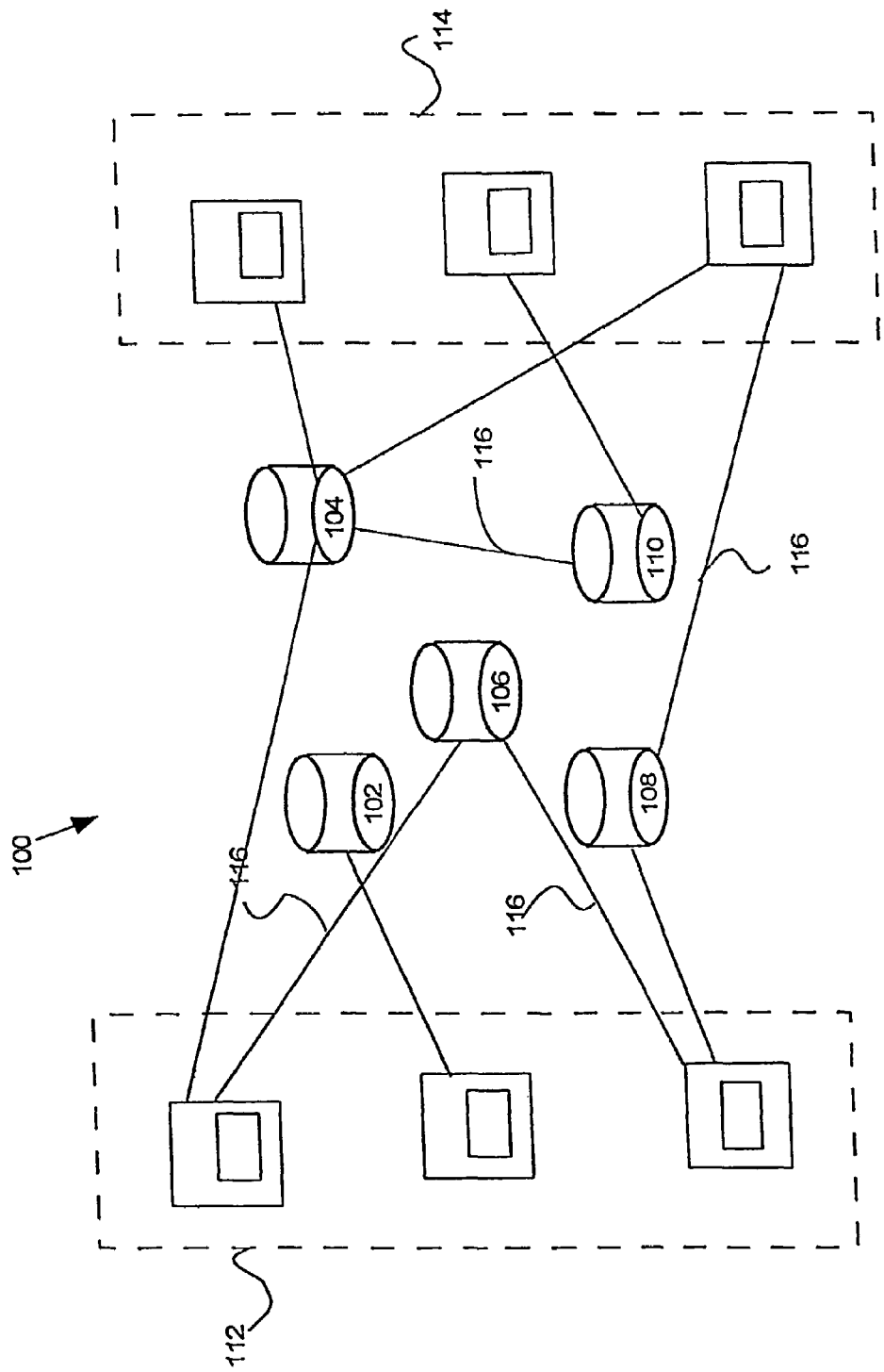
FIG. 1 is an illustration of a conventional enterprise computing system.
Figure 2:
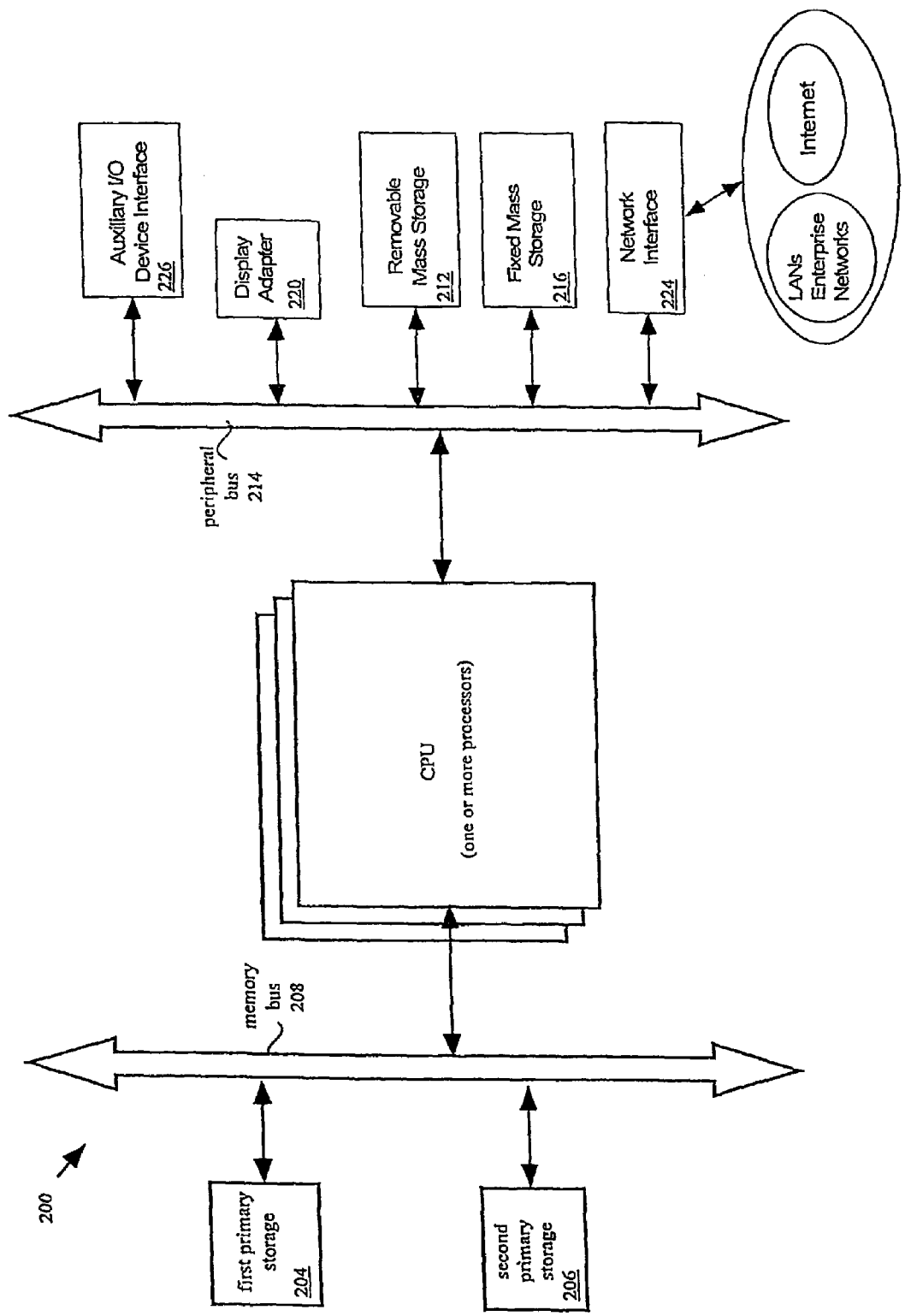
FIG. 2 is a block diagram of a general purpose computer system suitable for carrying out the processing according to the present invention.

FIG. 2 is a block diagram of a general purpose computer system 200 suitable for carrying out the processing according to the present invention. Computer system 200, made up of various subsystems described below, includes at least one microprocessor subsystem (also referred to as a central processing unit, or (CPU) 202). That is, CPU 202 can be implemented by a single-chip processor or by multiple processors. CPU 202 is a general purpose digital processor which controls the operation of the computer system 200. Using instructions retrieved from memory, the CPU 202 controls the reception and manipulation of input data, and the output and display of data on output devices.

CPU 202 is coupled bi-directionally with a primary storage device 204, typically random access memory (RAM), and uni-directionally with a primary storage device 206, typically a read-only memory (ROM), via a memory bus 208. As is well known in the art, primary storage device 204 can be used as a general storage area and as scratch-pad memory, and can also be used to store input data and processed data. The primary storage device 204 can also store programming instructions and data, in the form of data objects or constructs representing units of information in addition to other data and instructions for processes operating on CPU 202. The primary storage device 204 can also be used for fast transfer of data and instructions in a bi-directional manner over the memory bus 208. Also as well known in the art, primary storage device 206 typically includes basic operating instructions, program code, data and objects used by the CPU 202 to perform its functions. Primary storage devices 204 and 206 may include any suitable computer-readable storage media, described below, depending on whether, for example, data access needs to be bi-directional or uni-directional. CPU 202 can also directly and very rapidly retrieve and store frequently needed data in a cache memory 120.

A removable mass storage device 222 provides additional data storage capacity or the computer system 200, and is coupled either bi-directionally or uni-directionally to CPU 202 via a peripheral bus 224. For example, a specific removable mass storage device commonly known as a CD-ROM typically passes data uni-directionally to the CPU 202, whereas a floppy disk can pass data bi-directionally to the CPU 202. Storage device 222 may also include computer-readable media such as magnetic tape, Rash memory, signals embodied on a carrier wave, PC-CARDS, portable mass storage devices, holographic storage devices, and other storage devices. A fixed mass storage device 216 also provides additional data storage capacity and is coupled bi-directionally to CPU 202 via peripheral bus 224. The most common example of mass storage device 216 is a hard disk drive. Generally, access to these media is slower than access to primary storage device 204 and 206. Mass storage device 222 and 216 generally store additional programming instructions, data, and the like that typically are not in active use by the CPU 202. It will be appreciated that the information retained within mass storage device 222 and 216 may be incorporated, if needed, in standard fashion as part of primary storage device 204 (e.g. RAM) as virtual memory. In addition to providing CPU 202 access to storage subsystems, the peripheral bus 224 is used to provide access other subsystems and devices as well. In the described embodiment, these include a display monitor 218 and adapter 220, a printer device 222, a network interface 224, an auxiliary input/output device interface 226, a sound card 228 and speakers 230, and other subsystems as needed.

The network interface 224 allows CPU 202 to be coupled to another computer, computer network, or telecommunications network using a network connection as shown. Through the network interface 224, it is contemplated that the CPU 202 might receive information e.g., data objects or program instructions, from another network, or might output information to another network in the course of performing the above described method steps. Information, often represented as a sequence of instructions to be executed on a CPU, may be received from and outputted to another network, for example, in the form of a computer data signal embodied in a carrier wave. An interface card or similar device and appropriate software implemented by CPU 202 can be used to connect the computer system 200 to an external network and transfer data according to standard protocols. That is, method embodiments of the present invention may execute solely upon CPU 202, or may be performed across a network such as the Internet, intranet networks, or local area networks, in conjunction with a remote CPU that shares a portion of the processing. Additional mass storage devices (not shown) may also be connected to CPU 202 through network interface 224.

Auxiliary I/O device interface 226 represents general and customized interfaces that allow the CPU 202 to send and, more typically, receive data from other devices such as microphones, touch-sensitive displays, transducer card readers, tape readers, operation of the computer system 200. Using instructions retrieved from memory, the CPU 202 controls the reception and manipulation of input data, and the output and display of data on output devices. CPU 202 is coupled bi-directionally with a first primary storage device 204, typically random access memory (RAM), and uni-directionally with a second primary storage area 206, typically a read-only memory (ROM), via a memory bus 208. As is well known in the art, primary storage device 204 can be used as a general storage area and as scratch-pad memory, and can also be used to store input data and processed data. It can also store programming instructions and data, in the form of data objects or constructs representing units of information in addition to other data and instructions for processes operating on CPU 202, and is used typically used for fast transfer of data and instructions in a hi-directional manner over the memory bus 208. Also as well known in the art, primary storage device 206 typically includes basic operating instructions, program code, data and objects used by the CPU 202 to perform its functions. Primary storage devices 204 and 206 may include any suitable computer readable storage media, described below, depending on whether, for example, data access needs to be bi-directional or unidirectional. CPU 202 can also directly and very rapidly retrieve and store frequently needed data in a cache memory 220.

A removable mass storage device 222 provides additional data storage capacity or the computer system 200, and is coupled either bi-directionally or uni-directionally to CPU 202 via a peripheral bus 224. For example, a specific removable mass storage device commonly known as CD-ROM typically passes data uni-directionally to the CPU 202, whereas a floppy disk can pass data bi-directionally to the CPU 202. Storage device 222 may also include computer-readable media such as magnetic tape, flash memory, signals embodied on a carrier wave, PC-CARDS, portable mass storage devices, holographic storage devices, and other storage devices. A fixed mass storage 116 also provides additional data storage capacity and is coupled bi-directionally to CPU 202 via peripheral bus 224. The most common example of mass storage device 216 is a hard disk drive. Generally, access to these media is slower than access to primary storage device 204 and 206. Mass storage device 222 and 216 generally store additional programming instructions, data, and the like that typically are not in active use by the CPU 202. It will be appreciated that the information retained within mass storage device 222 and 216 may be incorporated, if needed, in standard fashion as part of primary storage device 204 (e.g. RAM) as virtual memory.

In addition to providing CPU 202 access to storage subsystems, the peripheral bus 224 is used to provide access to other subsystems and devices as well. In the described embodiment, these include a display monitor 218 and adapter 220, a printer device 222, a network interface 224, an auxiliary input/output device interface 226, a sound card 228 and speakers 230, and other subsystems as needed.

The network interface 224 allows CPU 202 to be coupled to another computer, computer network, or telecommunications network using a network connection as shown. Through the network interface 224, it is contemplated that the CPU 202 might receive information, e.g., data objects or program instructions, from another network, or might output information to another network in the course of performing the above described method steps. Information, often represented as a sequence of instructions to be executed on a CPU, may be received from and output to another network, for example, in the form of a computer data signal embodied in a carrier wave. An interface card or similar device and appropriate software implemented by CPU 202 can be used to connect the computer system 200 to an external network and transfer data according to standard protocols that is, method embodiments of the present invention may execute solely upon CPU 202, or may be performed across a network such as the internet, intranet networks, or local area networks, in conjunction with a remote CPU that shares a portion of the processing. Additional mass storage devices (not shown) may also be connected to CPU 202 through network interface 224.

In addition, embodiments of the present invention further relate to computer storage products with a computer readable medium that contain program code for performing various computer implemented operations. The computer readable medium is any data storage device that can store data which can thereafter be read by a computer system the media and program code may be those specially designed and constructed for the purposes of the present invention, or they may be of the kind well known to those of ordinary skill in the computer software arts. Examples of computer readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices.

The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 208, peripheral bus 224, and local bus 234 are illustrative of any interconnection scheme serving to link the subsystems. For example, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical. disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 208, peripheral bus 224, and local bus 234 are illustrative of any interconnection scheme serving to link the subsystems. For example, a local bus could be used to connect the CPU to fixed mass storage device 216 and display adapter 220. The computer system shown in FIG. 2 is but an example of a computer system suitable for use with the invention. Other computer architectures having different configurations of subsystems may also be utilized.

Figure 3:
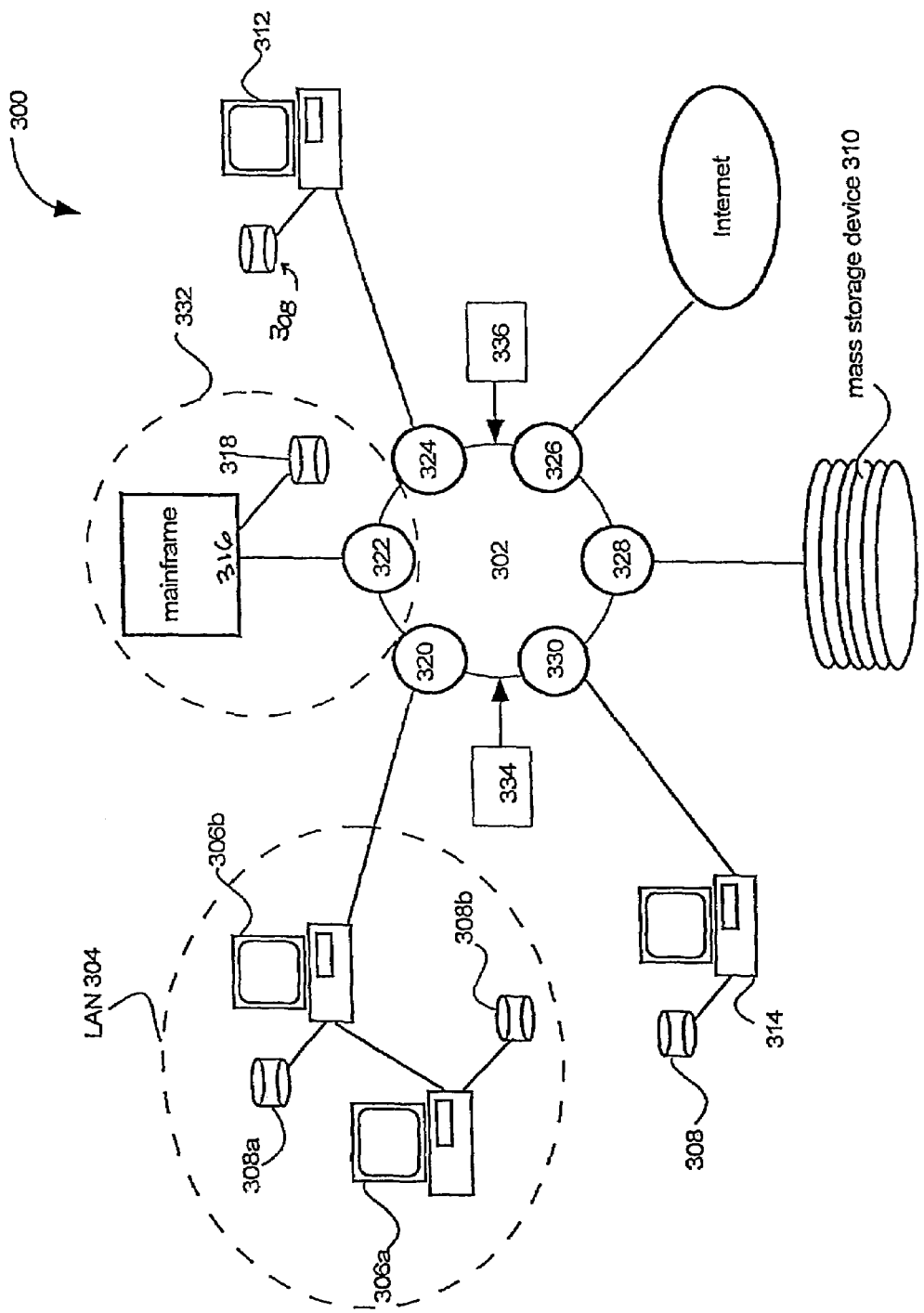
FIG. 3 is an enterprise computer system in accordance with an embodiment of the invention.

Referring to FIG. 3, an enterprise computer system 300, in accordance with an embodiment of the invention, is shown. The enterprise computer system 300 includes any number of information resources organized around an information broker 302. Information resources are producers and/or consumers of corporate information, for example, and can include networks, such as Local Area Network (LAN) 304 that in turn includes any number of individual computer systems 306a and 306b, for example. Such computer systems can take the form of computer system 200 shown in FIG. 2 and as such can include mass storage devices, network interfaces, etc. In addition to LAN 302, information resources can include conventional to databases represented by mass storage unit 310, applications resident on computers 312 and 314, as well as the internet. the mass storage device 310 typically stores information in the form of useful documents.

Typically, each of the individual computer systems included in the enterprise computer system 300 is coupled to an associated storage device 308. For example, the computer systems 306a and 306b of the LAN 304 each have an associated storage device 308a and 308b, respectively. One or more of these storage devices can be utilized to store various data objects or documents which may be periodically accessed and processed by a user within the enterprise computer system 300. The enterprise computer system 300 also includes a mainframe computer 316. The mainframe computer 316 may also be connected to a storage device 318 capable of acting as a remote storage device for the LAN 304, for example.

As those skilled in the art can appreciate, the components of the enterprise computer system 300 may be located a great geographical distance from each other. By way of example, the mainframe 316 may be located in, for example, San Francisco, while the LAN 304 may be located in Los Angeles.

The enterprise computer system 300 also includes adapters 320 through 330 arranged to connect associated information resource to the information broker 302. By way of example, the adapter 320 connects LAN 304 to the information broker 302 while the adapter 328 connects the mass storage device 310 to the information broke 302. the combination of an information resource and its associated adapter is referred to as a broker client. By way of example, the mainframe 316 and its associated adapter 322 form a broker client 332.

In the described embodiment, adapters integrate diverse information resources by enabling them to exchange a common unit of information referred to hereinafter as the event. Events are messages exchanged by broker clients. To send an event, a broker client publishes it, conversely, to receive events of a particular type, a broker client subscribes to that event type. Each event is typed to distinguish it from other events, and self-describing, so it can be filtered by its contents. Events constitute both a common currency for information exchange and a common language suitable for describing and discussing disparate corporate information. Agents are software components that embody business processes by subscribing to particular types of events, applying business rules to those events, and as a result, publishing other types of events. As shown in FIG. 3, agents 334 and 336 are coupled to the information broker 302 providing thereby the capability of applying any desired business rule to any event received by the information broker 302.

Typically, users in different portions of the enterprise computer system 300 use substantially different computing platforms since each user may in fact have very different data processing requirements. These heterogeneous computing platforms can include, for example application programs suitable for processing critical business transactions such as order entry, shipping, billing, receivables, and so on resident on computer 312 or 314. Since many of these applications come in "package" form (i.e., bought as turn key application with little or no user knowledge of the software itself besides being able to use it) many users are either reluctant or incapable of modifying the application software to make it compatible with other computing platforms.

Just as many users use multiple platform types in the enterprise computer system 300, many users also have adopted multiple programming models. Such programming models include, for example, transactions and remote procedure calls (RPC), COBOL and C++, relational and hierarchical databases, and Visual Basic and HTML forms. As known in the art, each programming model typically includes programming code based upon different models.

Figure 4A:
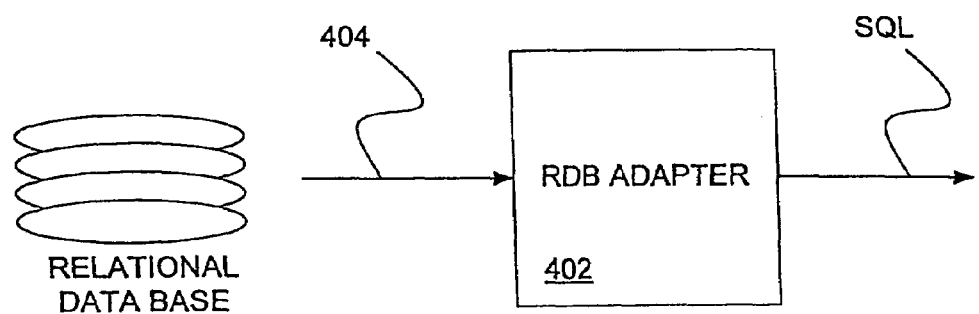
FIG. 4A shows how a relational data base (RDB) adapter translates an event to SQL in accordance with an embodiment of the invention.
Figure 4B:
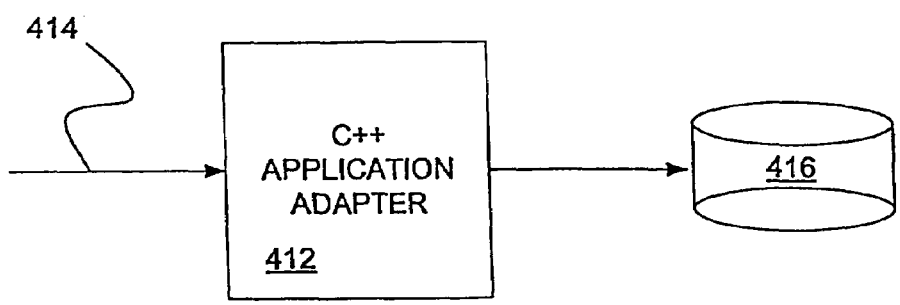
FIG. 4B shows a C++ application adapter mapping an event to data structures in a memory in accordance with an embodiment of the invention.

Since an adapter translates between local information currency of a particular broker client combination to the common information currency of events, any of the heterogeneous computing platforms resident in the enterprise computer system 300 are capable of communication. By way of example, as shown in FIG. 4A a relational database (RDB) adapter 402 translates an event 404 to SQL, while in FIG. 4B, a C++ application adapter 412 maps an event 414 to data structures in a memory 416.

Event

Figure 5A:
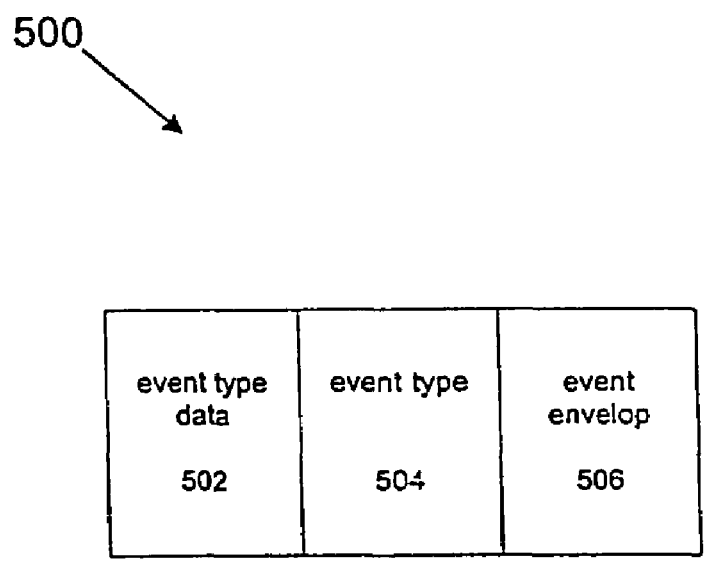
FIG. 5A shows an event in accordance with an embodiment of the invention.

An event is typically a business event that is discovered or created by one resource and is of interest to other resources. By way of example, a corporation can define events for their particular needs and practices related to marketing, billing, orders and shipments, manufacturing, employment, etc. Each event contains information particular to it, such as for example, Employee-Number or Invoice-Amount. Typically, each event contains sufficient information to completely characterize and analyze it without resorting to other resources, such as databases, which are subject to change. By way of example, FIG. 5A illustrates an event 500 in accordance with an embodiment of the invention. The event 500 includes an event type data field 502, an associated event data field 504, and an event envelop 506. In one embodiment of the invention, the event envelop 506 is populated by the system with system parameters, such as for example, transaction security fields, return addresses, etc.

Figure 5B:
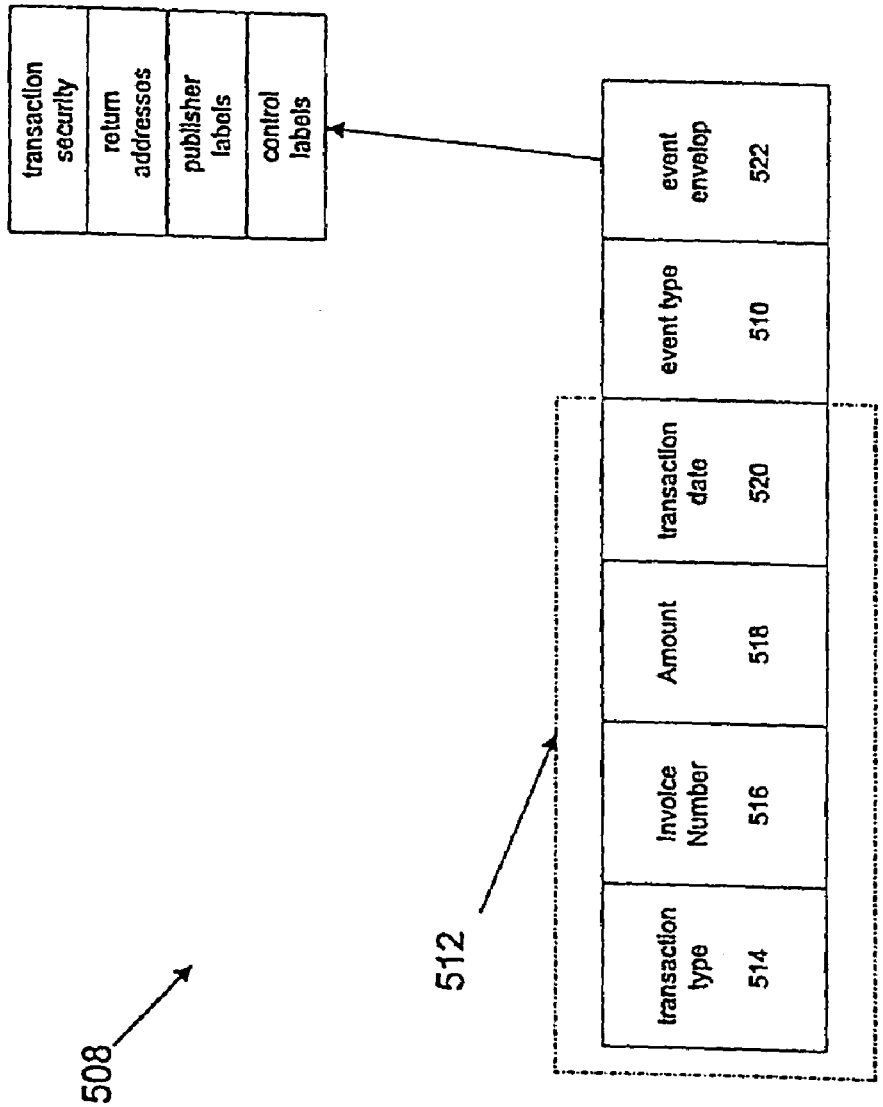
FIG. 5B shows an exemplary inventory control event in accordance with an embodiment of the invention.

By way of example, assuming for this example that an event 508 associated with a manufacturing company is shown in FIG. 5B. The event 508 then contains an event type data field 510 indicating for example, the event 508 pertains to inventory control. In this case, the associated event data field 512 would contain data fields specific to a particular inventory control transaction. Such transaction specific data fields would include, for example, a transaction type field 514, an Invoicenumber field 516, an Amount field 518, and a Transaction Date field 520. Other data fields can be included in the event data structure 500 at the discretion of the information resource producing the event 500. The associated event envelop 522 would then be populated by the system to include transaction security, return addresses, as well as control and publisher labels described below.

Event Transactions

Event producing resources publish events while event consuming resources subscribe to event types and receive events of those types. Some resources publish one set of events and subscribe to other types of events. Because event delivery is brokered, an unavailable subscriber never delays a publisher, and a subscriber only receives events when it is ready. The tasks of event queuing, routing, and delivery are the responsibilities of the information broker described shortly.

Figure 6A:
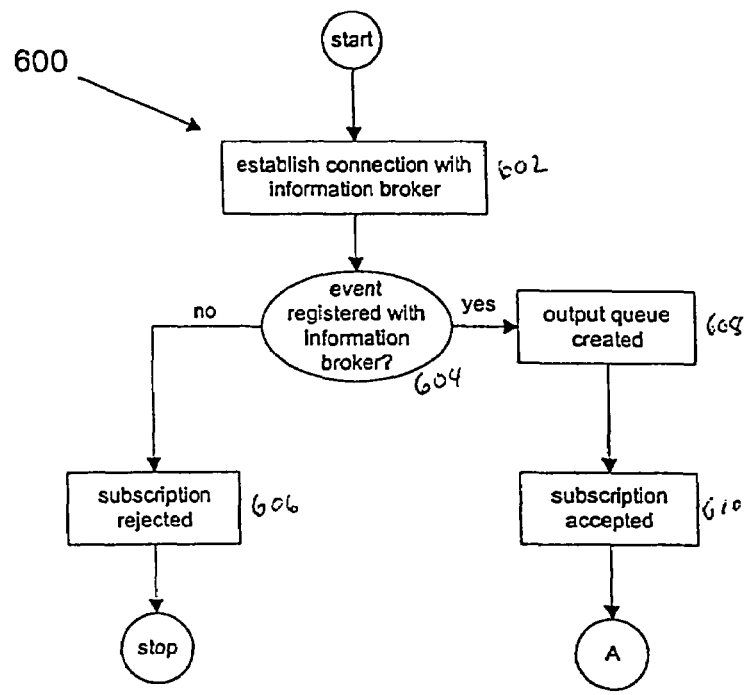
FIG. 6A is a flowchart detailing a process 600 of establishing a subscription to an event in accordance with an embodiment of the invention.

FIG. 6A is a flowchart detailing a process 600 of establishing a subscription to an event in accordance with an embodiment of the invention. In order to establish a subscription to an event, a connection with an information broker 602 must be established. It is then determined if the event is registered with the information broker 604. If it is determined that the event is not registered with the information broker, then the subscription is rejected 606. If, however, it is determined that the event is registered with the information broker, then an output queue is created 608 and the subscription is accepted 610.

Figure 6B:
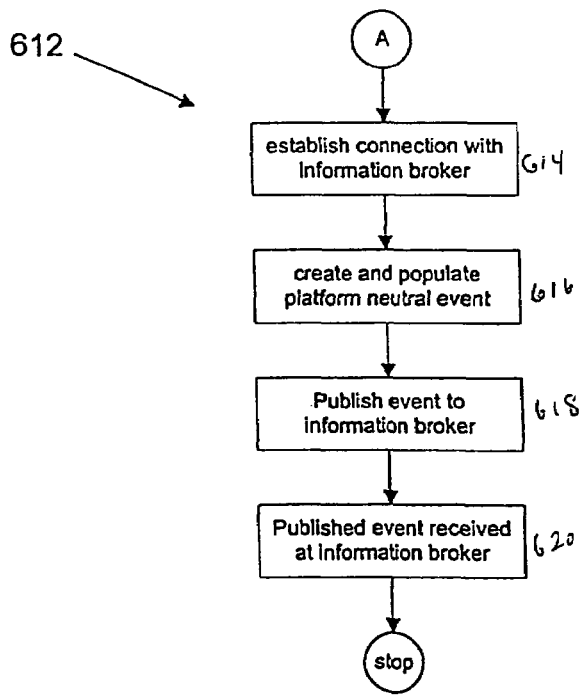
FIG. 6B is a flowchart detailing a process for publishing a subscripted to event in accordance with an embodiment of the invention.

FIG. 6B is a flowchart detailing a process 612 for publishing a subscripted to event in accordance with an embodiment of the invention. Once the subscription has been accepted as described in FIG. 6A, a connection with the information broker in which the event is registered is established 614. A platform neutral event is then created and populated 616 after which the event is then published to the information broker 618 which then subsequently receives it 620.

Figure 7:
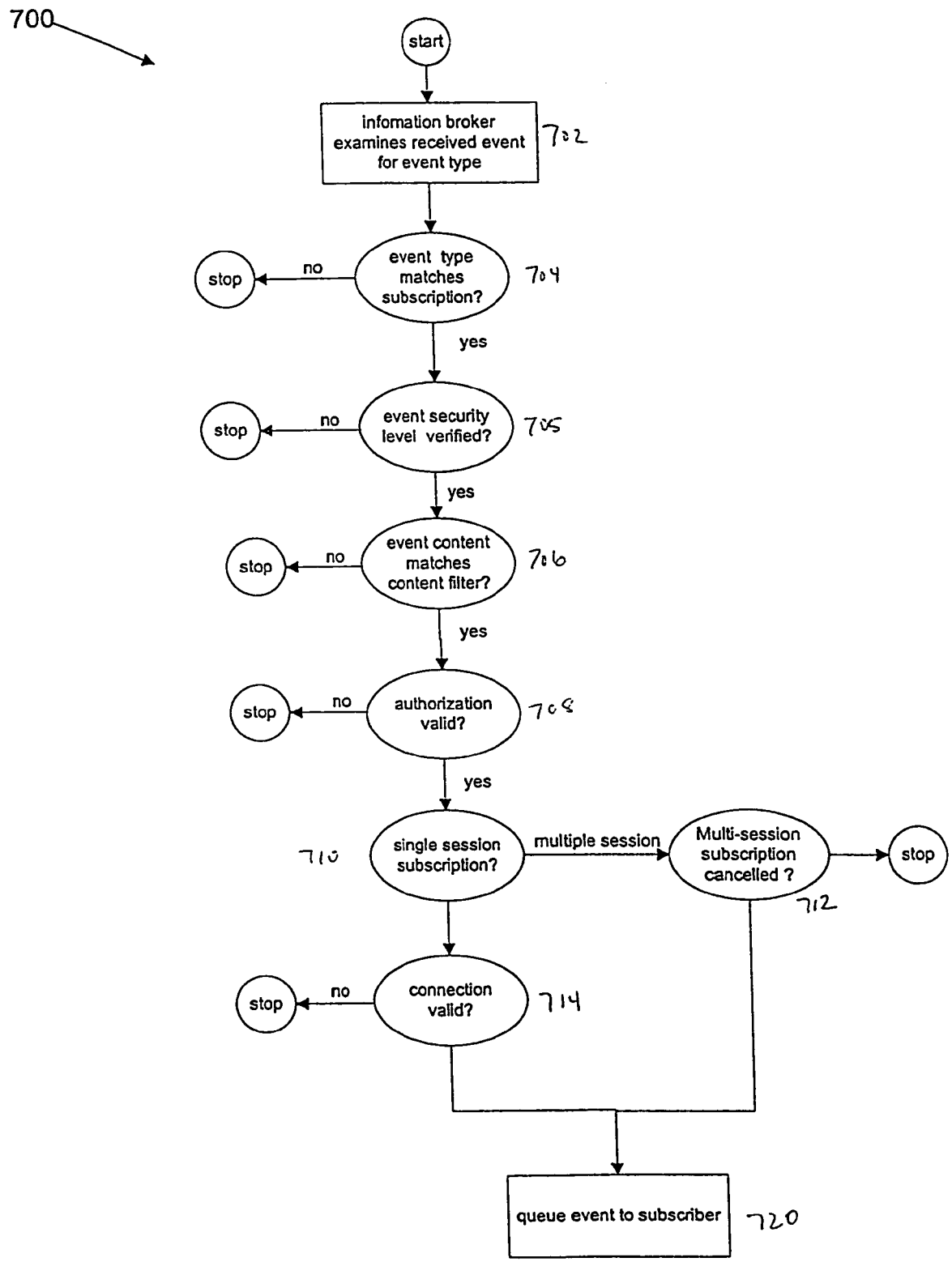
FIG. 7 is a flowchart detailing a process of whereby an information broker delivers an event to a subscriber in accordance with an embodiment of the invention.

FIG. 7 is a flowchart detailing a process 700 whereby an information broker delivers an event to a subscriber in accordance with an embodiment of the invention. In an embodiment of the invention, in order to receive published events of a particular type, a broker client (referred to as a subscriber) must have entered a corresponding subscription with an information broker. Subscriptions can be registered manually by using administrative tools or automatically by adapters. There are two kinds of subscriptions, single session and multi session. A single session subscription remains effective unit the subscriber breaks the network connection with its broker. A multi session subscription persists until it is cancelled. When a multi session subscriber notifies an information broker that it is ready to receive events, the information broker delivers the events it has queued.

When an information broker receives a published event, it examines its subscription for the event type 702 and then determines if the event type matches the subscription 704. For each matching subscription, the information broker delivers, queues, or ignores the event, depending on whether the subscription is single session or multi session and whether the subscriber is running or not. The information broker determines if the event security level is verified 705 then determines if the event content matches a content filter 706. For each matching subscription, the information broker then determines if the event's authorization is valid 708. For all authorized events, the information broker then determines whether the matching subscription is a single session subscription or a multi-session subscription 710. If it is determined to be a multi-session subscription, the information broker then determines if the multi-session subscription is cancelled 712. If the multi-session subscription is cancelled, the information broker ignores the event and stops processing. If, however, the multi-session subscription is not cancelled, the information broker determines if the connection is valid 714. If the connection is valid, the information broker queues the event to the subscriber 720.

In addition to shielding publishers and subscribers from event delivery problems, including intermittent network failures, information brokers have important administrative functions They maintain registries of events that developers can browse. They provide data on publish and receive rates of resources, lengths of queues, and so on, exposing network problems and possibly indicating that a hardware upgrade may soon be in order.

It should be noted that adding and deleting subscribers has no effect on publishers; neither does adding or deleting publishers affect subscribers. Publishers and subscribers can be altered, or even replaced, so long as the contract specified in their mutual event definitions is observed. Although the publish/subscribe model fits many resource communication needs, it does not fit all of them.

Figure 8:
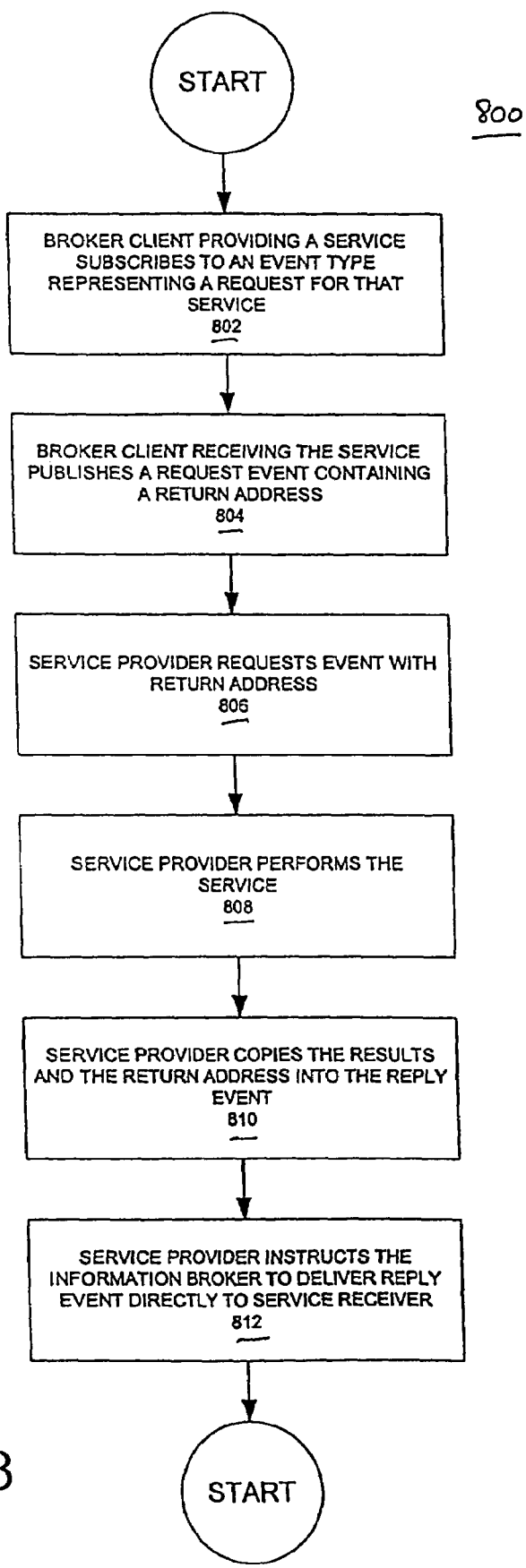
FIG. 8 is a flowchart detailing the process of request/reply in accordance with an embodiment of the invention.

FIG. 8 is a flowchart detailing the process 800 of request/reply in accordance with an embodiment of the invention. A broker client that provides a service subscribes to an event type that represents a request for that service 802. To obtain the service, a broker client publishes a request event containing a "return address" 804. The return address consists of the requestor's ID, possibly generated by the information broker, and a tag that distinguishes the event from others the requester has published. The service provider receives the request event 806, performs the service 808, and copies the results and the return address into the reply event 810. Then, instead of publishing the reply, the service provider directs the broker to deliver it 812. Because the reply event contains the address of its sole recipient, the broker can queue or deliver it instantly, bypassing subscription matching and filtering. The recipient does not need a subscription to the reply event type, but must be a member of what is referred to as a client group that has permission to receive it; the service provider must be a member of a client group (i.e., associated group of clients) that has permission to send the reply type. By way of example, each client group lists the types of events that members of the group are authorized to send (publish or deliver) and the types of events they are authorized to receive (by subscription or reply).

Information Brokers

One aspect of information brokers is that they guarantee that, with respect to a particular subscriber, events are delivered exactly once and same-priority events from one publisher are delivered in the order they were published. The first part of this guarantee frees subscribers from having to detect duplicate events, which they must do in enterprise computer systems that deliver messages at least once. The second part enables publishers and subscribers to rely on event temporal effects. For example, suppose that a publisher publishes event A and then event B, and that a subscriber responds to event A by creating something that's needed for responding to event B-a database record, for example. If a network problem delays event A so that B arrives first, the subscriber would perform erroneously unless it is encumbered with logic for handling out-of-order arrivals. The event delivery guarantee is an example of concentrating complexity in information brokers to simplify associated broker clients.

Figure 9:
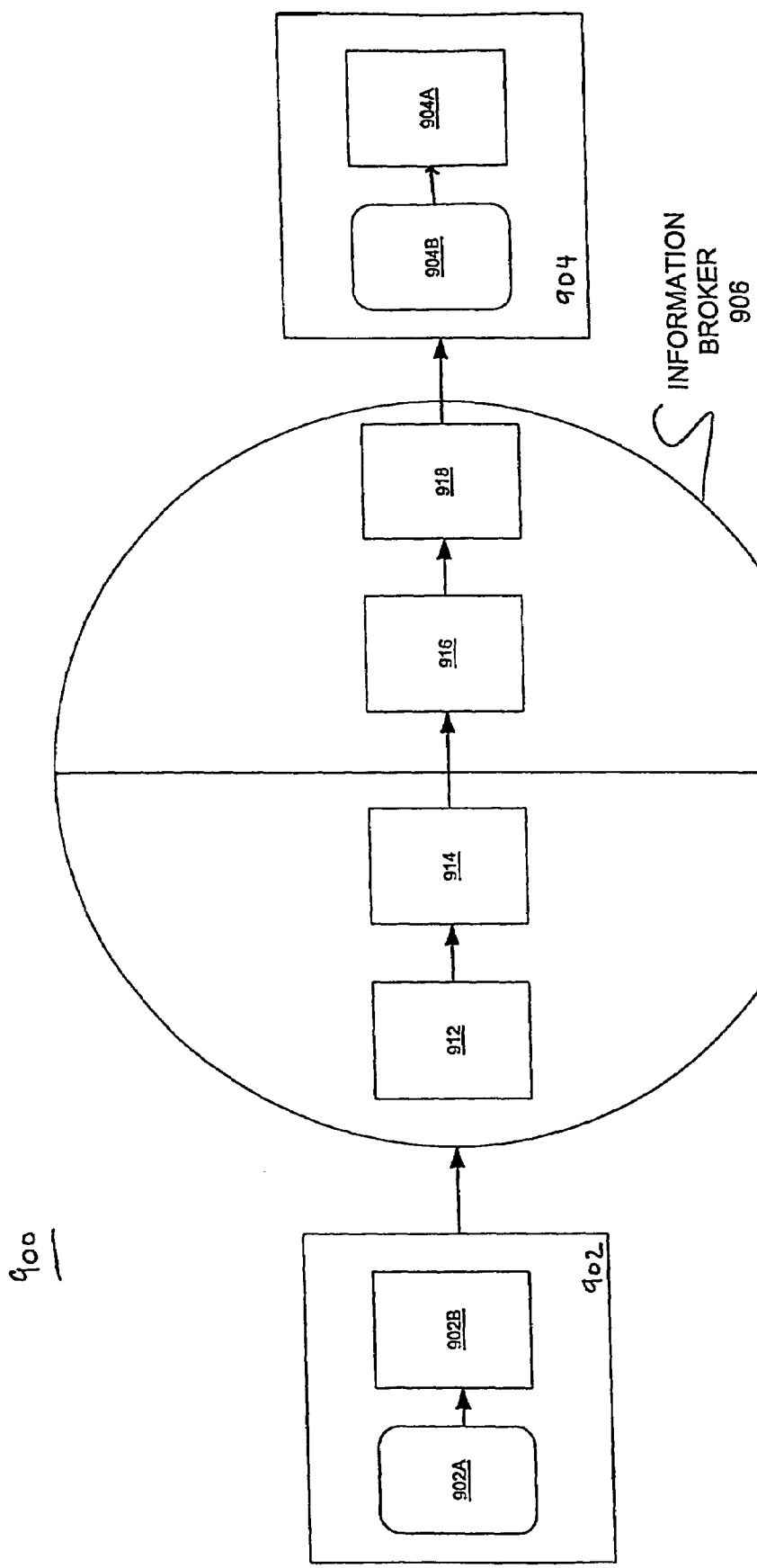
FIG. 9 is an enterprise computer system in accordance with an embodiment of the invention.

FIG. 9 is an enterprise computer system 900 in accordance with an embodiment of the invention. It should be noted that enterprise computer system 900 is one embodiment of the enterprise computer system 300 shown in FIG. 3. It should also be noted, that the connotation of publisher and subscriber is for sake of clarity only and it should be borne in mind that any broker-client can be a publisher or a subscriber as deemed appropriate.

The enterprise computer system 900 includes a publisher 902, a subscriber 904, and an information broker 906. In the described embodiment, the publisher 902 includes a publisher information resource 902a connected to a publisher adapter 902b while the subscriber 904 includes a subscriber information resource 904a connected an associated subscriber adapter 904b. The information broker includes a pre-processor 912 connected to a pre-processing queue 914 arranged to store any event preprocessed and sent by the pre-processor 912. In one embodiment of the invention, the pre-processor 912 populates the event envelop that includes, for example, return address, content and publisher labels. In a preferred embodiment of the invention, the preprocessor 912 uses the various data fields included in the event envelop to appropriately process the event. The pre-processing queue 914 is, in turn, connected to an event filter 916. The event filter 916 is used by the information broker 906 to filter those events received from the pre-processing queue 914. By filter, it is meant that the event filter 916 determines the event type of the event sent by the pre-processing queue 914 and matches the event type to those desired by the subscriber 904. In one embodiment of the invention, the event filter 916 includes a content filter that specifies a subset of events by field values. For example, a subscriber to InvoiceSent events might attach a content filter specifying Invoice Amount $50,000; the broker will not deliver events with smaller amounts to this subscriber. Content filtering by brokers is made possible by the self-describing and strong typing features of events.

In operation, the publisher 902 invokes the publisher adapter 902b that validates a connection to the information broker 906. After the connection to the information broker has been successfully validated, the publisher adapter 902b publishes an event having an associated event type by sending the event to the pre-processor 912. After confirmation of proper registration and proper connection validation, the event is passed to the pre-processor queue 914 where it is stored until requested by the information broker 906. Once requested, the event is passed to the event filter 916, which can include a content-filter described above. Once the event is filtered, the information broker 906 stores the event in queue 918 and then queries the subscriber types requested by the subscriber 904. If the filtered event is desired by the subscriber 904, the event is passed to the subscriber adapter 904b where it is converted to a platform consistent with the subscriber information resource 904a.

Figure 10:
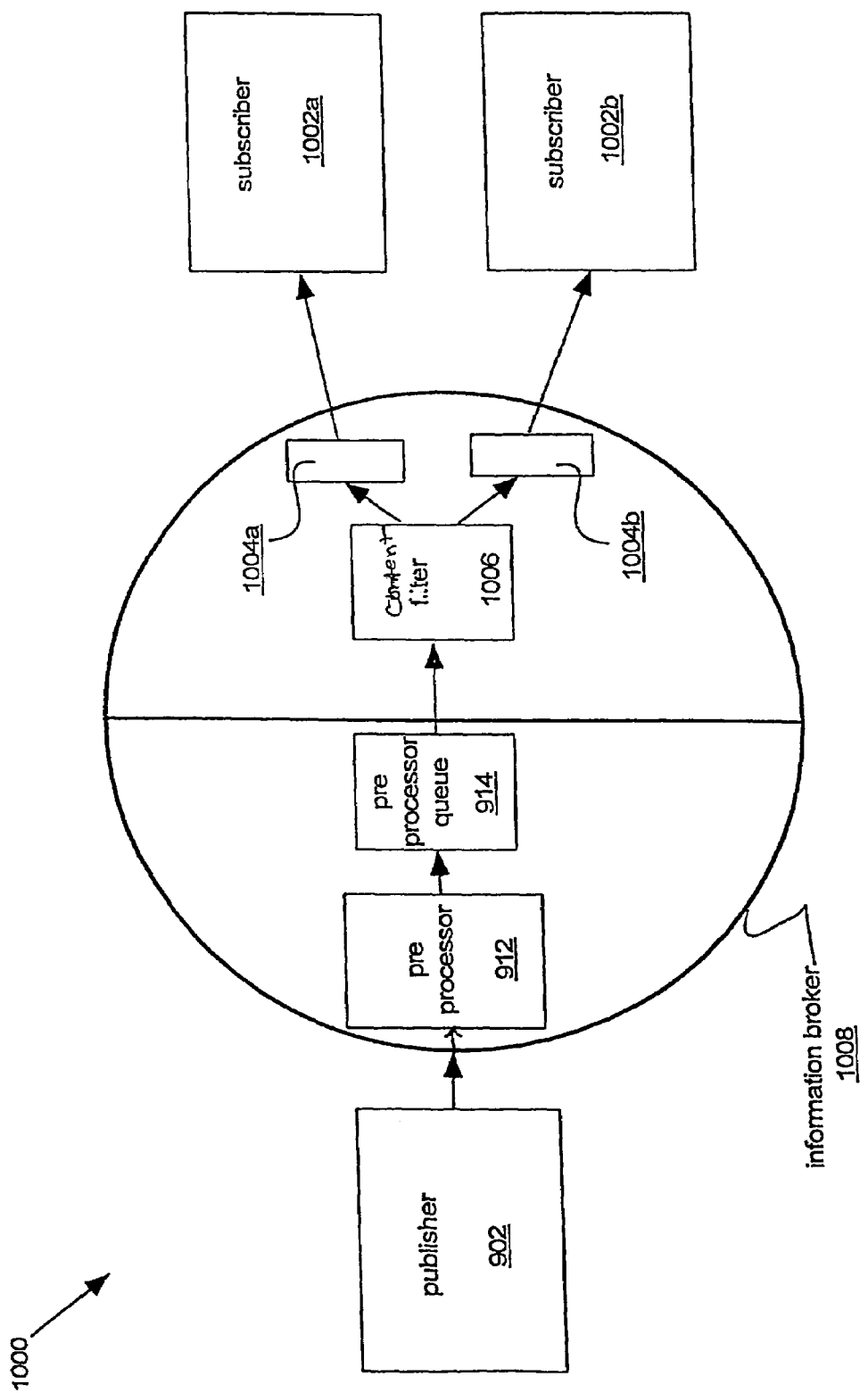
FIG. 10 is an enterprise computer system having multiple subscribers in accordance with an embodiment of the invention.

FIG. 10 is an enterprise computer system 1000 having multiple subscribers 1002 in accordance with an embodiment of the invention. It should be noted that the enterprise computer system 1000 is one embodiment of the enterprise computer system 900 having multiple subscribers 1002. Accordingly, the enterprise computer system 1000 will be described with reference to elements shown in FIG. 9 consistent with those portions of enterprise system 900 already described and discussed. As shown in FIG. 10, enterprise computer system 1000 includes a first subscriber broker client 1002a having an associated subscriber queue 1004a and a second subscriber broker client 1002b having an associated subscriber queue 1004b. When an event is processed by the event filter 1006, the information broker 1008 determines if the event is of the type desired by either of the subscribers 1002a and 1002b. If the event is of the type desired by either or both of the subscribers 1002a and 1002b, then the event is stored in associated subscriber queues 1002b and 1002a in priority order until requested by either or both subscribers 1002a and 1002b. In this way, the information broker 1000 is capable of managing any number of subscribers as well as any number of publishers.

As shown in FIG. 10, multiple identical subscribers can share a single broker queue resulting in improved load sharing or increased availability. In this way, the information broker 1006 guarantees exactly once in the order published delivery for shared queues as well as single subscriber queues. Because all events flow through them, information brokers are well suited for event monitoring tools. But they are also potential performance bottlenecks. Administrators can make performance trade offs by selecting the storage mechanism the broker uses for queuing events and other data. Guaranteed storage uses a robust commit procedure that is extremely reliable and necessarily slow. Volatile storage is memory-based; it is fast but vulnerable to power and other failures. Persistent storage occupies the middle ground, trusting operating system asynchronous I/O to write events to disk. Event encryption and checksumming are other performance affecting options that administrators can enable or disable for each event type a broker handles.

Figure 11:
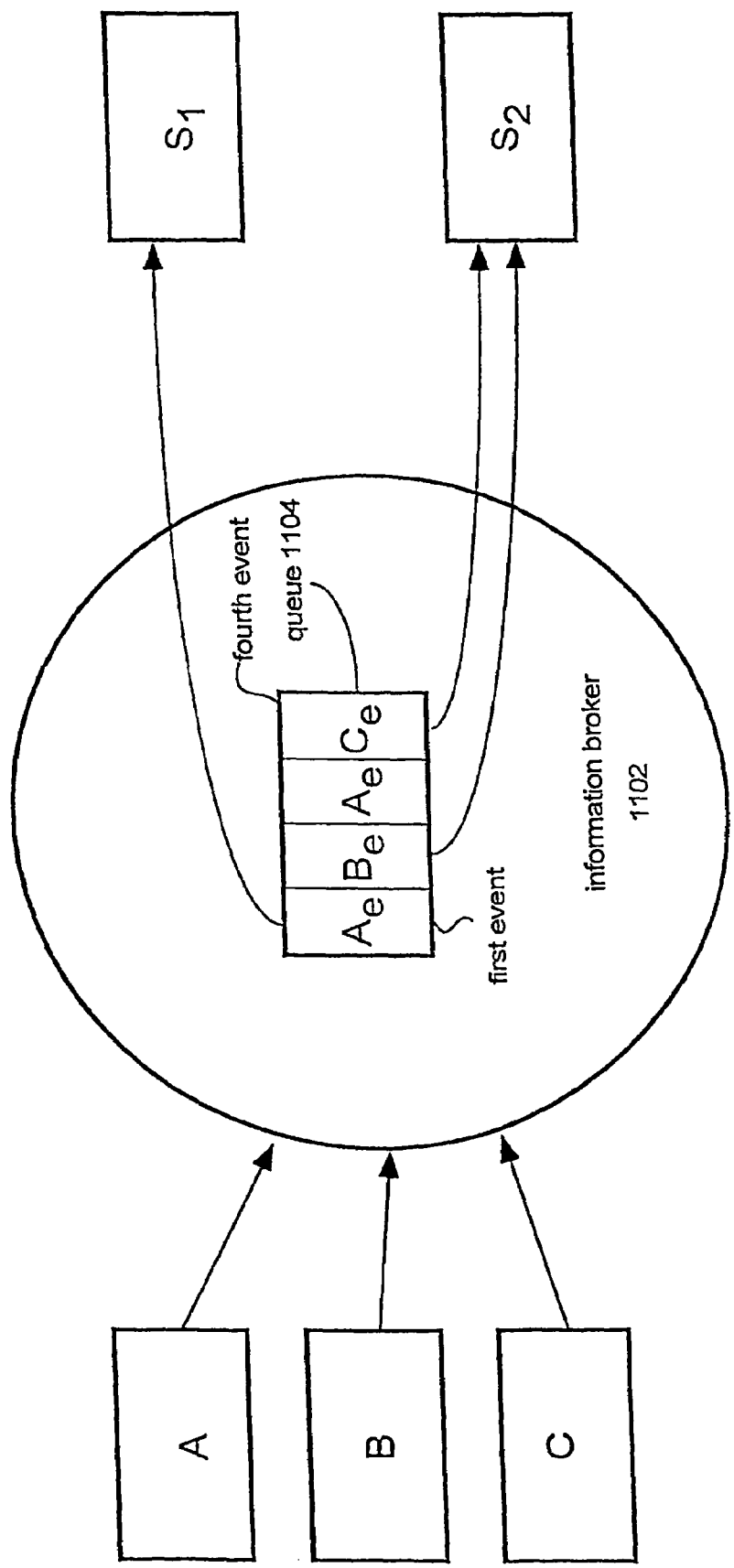
FIG. 11 shows an information broker queue sharing in accordance with an embodiment of the invention.

FIG. 11 shows an information broker 1102 queue sharing in accordance with an embodiment of the invention. The information broker 1102 "jumps the queue" to keep queue sharing subscribers busy while ensuring that they can rely on side effects with respect to events from one publisher. As shown in FIG. 11, three clients, A, B and C are publishing events of the same type to the information broker 1102. Two subscribers $S_1$ and $S_2$ sharing a queue 1104 which is holding four of these same type events in it. When the first subscriber ($S_1$) is ready for an event, the information broker 1102 will hand first subscriber ($S_1$) the first event from publisher A. When the second subscriber ($S_2$) is ready to receive an event, the information broker 1102 hands the second event from publisher B to the second subscriber $S_2$ The third event, also from publisher A, is next in the queue. In the case that the subscriber $S_1$, is still processing the first event from A, the third event also from A cannot be processed until the processing of the first event from A is completed by the first subscriber $S_1$. The information broker 1102 understands this conflict and "jumps the queue" to deliver the fourth event (from publisher C) to subscriber $S_2$. In this way, the information broker 1102 preserves pre-publisher event delivery order to subscribers $S_1$ and $S_2$.

Multiple Information Brokers

No matter what storage and security options are selected, sufficient event traffic volume can swamp a broker; moreover, delivery times can be unacceptable if events published on one side of the world must pass through a broker located on the other side. To accommodate variations in both volumes and geography, the architecture supports multiple cooperating information brokers.

Figure 12:
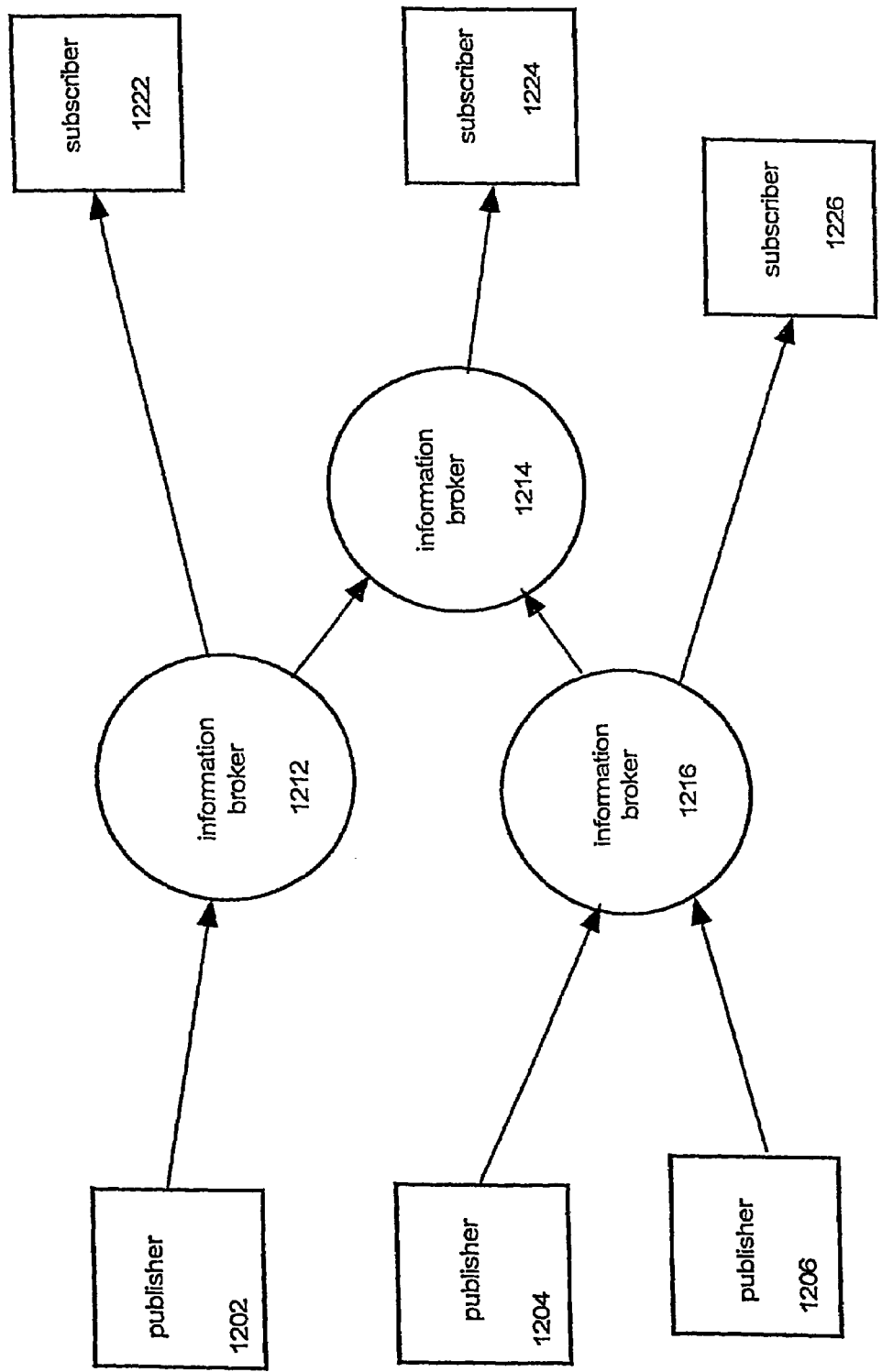
FIG. 12 in accordance with an embodiment of the invention, is an enterprise computer system having multiple cooperating information brokers.

FIG. 12, in accordance with an embodiment of the invention, is an enterprise computer system 1200 having multiple cooperating information brokers. The enterprise computer system 1200 includes a publisher broker clients 1202 through 1206 multiply connected to multiple information brokers 1212 through 1216. The information brokers 1212 through 1216 are in turn connected to subscribers 1222 through 1226 as deemed appropriate. Brokers can be added while other brokers are running. Multiple information brokers make the architecture scalable; it can meet increasing volumes with added capacity, and provide worldwide coverage without sacrificing fast local response and can be configured in any topology.

Information brokers deliver events to each other using an asynchronous store and forward technique. When a broker receives an event that a neighbor has subscribed to but the neighbor is unreachable, the broker reacts as it does for any subscriber: It queues the event and delivers it when the subscribing broker comes back up. If a broker is to be down for an extended period, an administrator can notify the broker's neighbors, which will then recompute routes and attempt to deliver messages that have been queued for the down broker, while maintaining the delivery order guarantees.

Agents

Agents are broker clients that use events to monitor and control business processes. They apply business rules and data transformations to subscribed events and publish the results. For example, a simple agent might decide which overdue accounts receive reminder notices. It could do so by subscribing to the InvoiceSent and PaymentReceived event types. If, 60 days after an invoice has been sent, a payment has not been received, the agent publishes a PrintReminder event. A bill printing resource, which subscribes to PrintReminder, prints the notice. Notice what software must be modified if the rule for printing reminders changes: the agent alone. The resources that publish InvoiceSent and PaymentReceived events, and the resource that subscribes to Printiteminder are unaffected by the rule change. Although this example is trivially simple, the technique of concentrating business rules in agents can be extended to arbitrarily complex business processes.

Security

Underlying all elements of the enterprise computer system 300 is a security model that addresses, for example, user and/or broker client authorization, event privacy and integrity, and the like. Security properties are associated with client groups in that all members of a client group have the same security properties.

Each client group lists the types of events that members of the group are authorized to send (publish or deliver) and the types of events they are authorized to receive (by subscription or reply). A particular broker client can publish a sensitive event (ChangeSalary, say), only if an administrator has made the broker client's type a member of a client group that is authorized to publish that type of event for example, the "human resources" client group.

In one embodiment of the invention, each client has an associated access label indicative of the kinds of data that the associated client can see. In the described embodiment, the access labels are assigned by an access label adapter included in the information broker.

Events have what is referred to as control labels which indicate the type of data contained in the event type data field. Events also have associated publisher labels indicating the security level possessed by the publisher. As described above, the control and publisher labels are stored in the event envelop and the publisher sets the control label whereas the information broker sets the publication label from the publisher's client label.

During operation, an information broker checks access labels when the event is sent to the client in order to assure that, for example, the client label "dominates" the event label. By dominate, it is meant that the client label has at least as high a security level as the event. By way of example, if a client 1 has an associated client label of [5,4, 1] then an event 1 having an event label of [5, 1] can be received by the client. However, an event 2 having an event label of [5,2] cannot be received by the client.

In one embodiment of the invention, an access label adapter provides the access labels to the information broker. Typically, the access labels are stored in an external resource such as a memory device.

When a broker client instance opens a connection to a broker, it asks to join a particular client group, which means to assume the properties of that client group. The broker verifies the client's membership in one of two ways.

Figure 13:
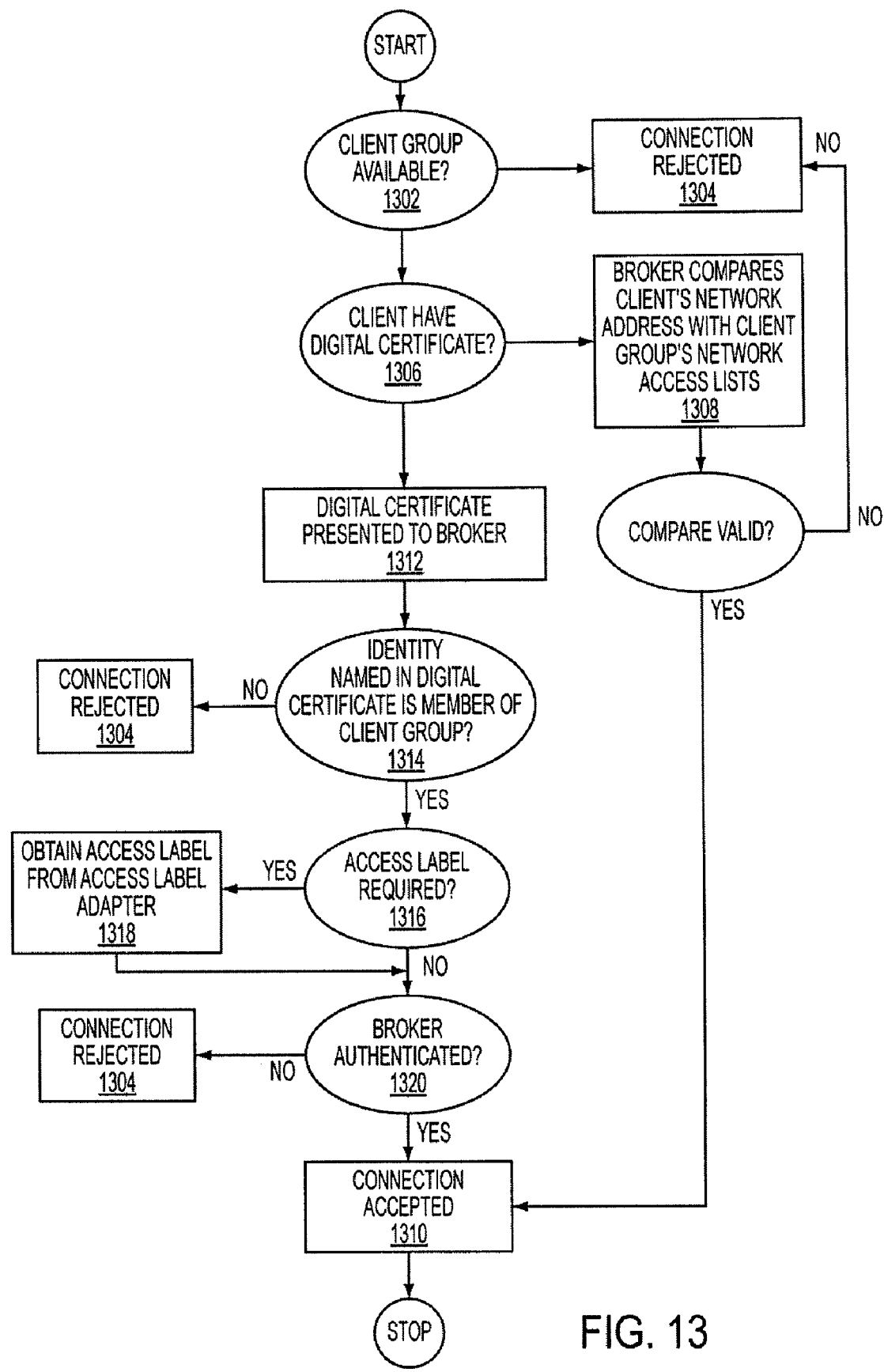
FIG. 13 is a flowchart detailing a process of verifying client membership in accordance with an embodiment of the invention.

FIG. 13 is a flowchart detailing a process 1300 of verifying client membership in accordance with an embodiment of the invention. The process of verification includes determining is a client group is available 1302. If the client group is not available, the connection is rejected 1304. If the client group is available, however, it is then determined if the client has a digital certificate attesting to its identity 1306. If client does not have a digital certificate, the broker then compares the client's network address with the client group's network access lists 1308. In the described embodiment, these lists, also established by an administrator, restricts membership in a client group to clients running on the hosts or residing in the subnets named in the list. Although network access lists are less secure than digital certificates, they are also less demanding of computing and administrative resources and can be appropriate for intranet use. If the comparison is not valid, then the connected is rejected 1304. Otherwise, the connection is accepted 1310. In one embodiment of the invention, certificates are digitally signed by a Certification Authority (CA) of which an administrator enters in the broker a list of well known and trusted CAs.

Returning to 1304, if the client has a digital certificate, it is presented to the information broker 1312. It is then determined if the identity named in the digital certificate is a member of the client group 1314. If not a member of the client group, then the connection is rejected 1304, otherwise, it is determined if a access label is required 1316. If an access label is required, then an access label is obtained from an access label adapter 1318, otherwise, the broker it is determined if the broker is authenticated 1320 so the client cannot fooled by a rogue application pretending it's an information broker. If the broker is not authenticated, then the connection is rejected 1304, otherwise the connection is accepted 1310.

In addition to prescribing which event types the client can publish or subscribe to, the client group properties specify whether the events sent between the client and the broker are encrypted for privacy and/or digitally signed for integrity. A subscriber can find out if the event traveled exclusively over secure links, even in a multi broker situation.

A broker client can be a member of multiple client groups. For each client group it wants to join concurrently, a client opens a separate channel to the broker. In this way, a client can send or receive the events associated with one client group in encrypted form, and the events associated with another client group in clear form thus incurring the overhead of encryption only for those events whose sensitivity justifies the expense.

Figure 14:
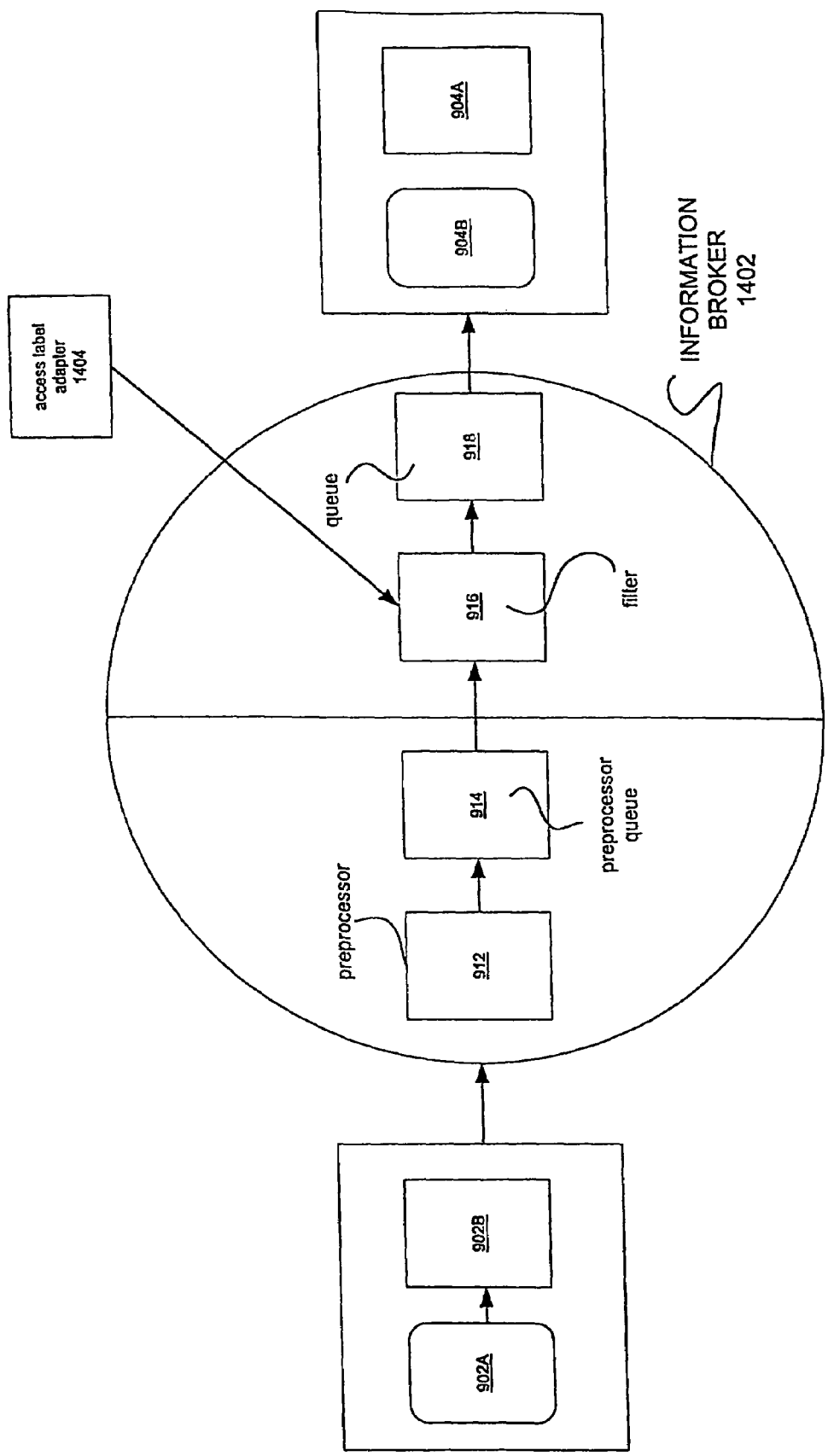
FIG. 14 in accordance with an embodiment of the invention, is an enterprise computer system having an authentication server.
Figure 15:
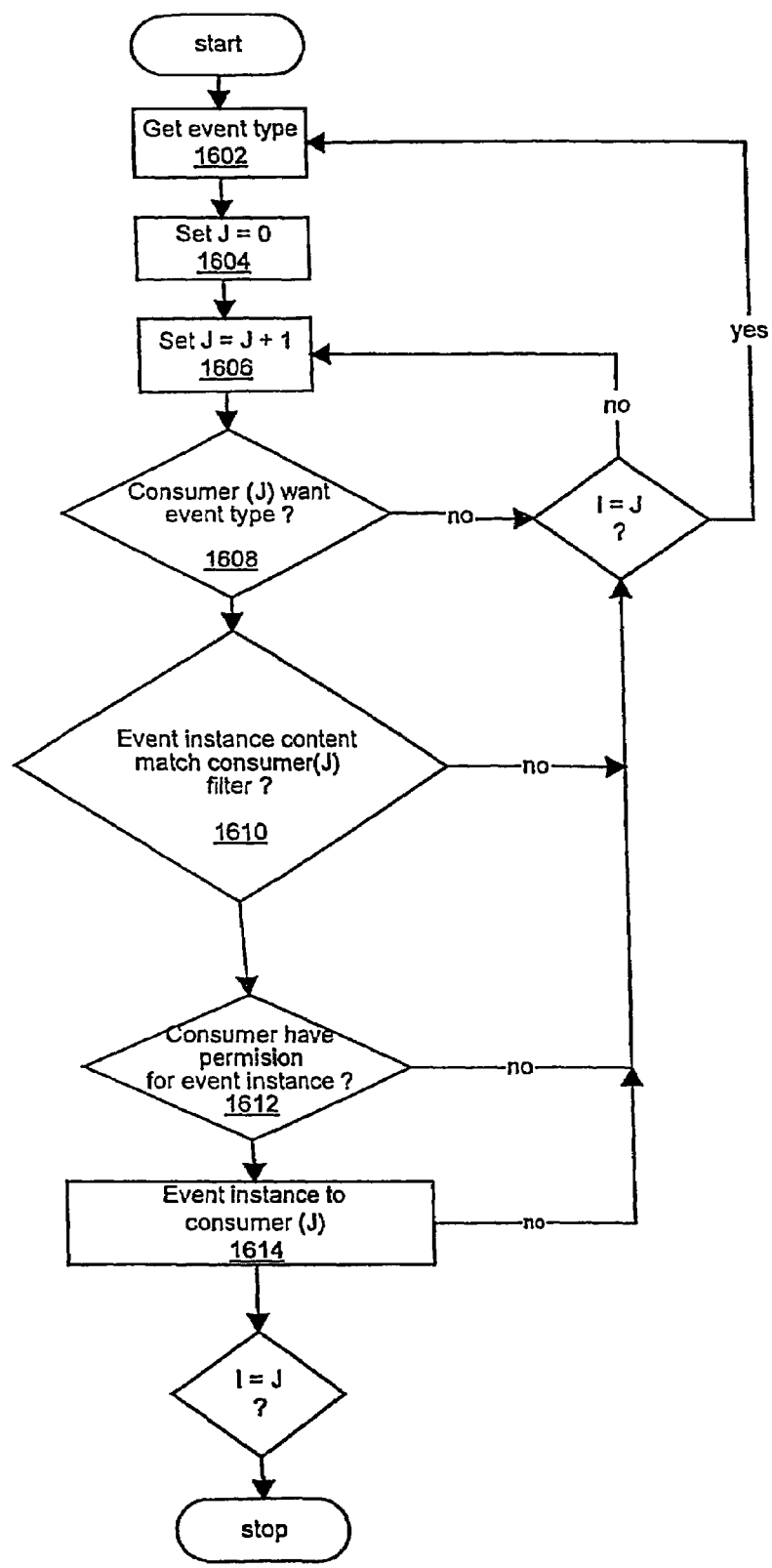
FIG. 15 is a flowchart detailing a process of authenticating an event based upon a subscriber authorization mask in accordance with an embodiment of the invention.

FIG. 14 is an illustration of an enterprise computer system 1400 having an access label adapter 1402 arranged to provide a subscriber authorization mask in accordance with an embodiment of the invention. The enterprise computer system 1400 is one embodiment of the enterprise computer system 900 shown in FIG. 9. The authentication server 1402 provides an authorization mask in the form of access labels indicative of the events for which a particular subscriber 904 can access. In operation, the access labels are used by the filter 916 to filter all incoming events determining, thereby, the subscribers 904 which are allowed access to the particular event and contents thereof FIG. 15 is a flowchart detailing an authentication process 1600 carried out in an enterprise computer system in accordance with an embodiment of the invention. The match filter receives the event and determines the event type 1602. A counter J is initialized to 0 1604 and incremented 1606. It is then determined whether a first subscriber wants the event type 1608. If it is determined that the first subscriber wants the event type, it is then determined if the event instance content matches the first subscriber filter 1610. If it is determined that the instance content matches the first subscriber filter, it is then determined if the first subscriber has permission to receive the event including the received authorization mask 1612. If the first subscriber has permission to receive the event, the event is delivered to the first subscriber 1614. Control then passes to the next subscriber, if any.

Although the foregoing invention has been described in some detail for purposes of clarity of understanding, it will be apparent that certain changes and modifications may be practiced within the scope of the appended claims. It should be noted that there are many alternative ways of implementing the present invention. It is therefore intended that the following appended claims be interpreted as including all such alterations, permutations, and equivalents as fall within the spirit and scope of the present invention.

What is claimed is:

1. An enterprise computer system, comprising:
   a publisher capable of publishing an event, wherein an event is a business event created by one resource and is of interest to another;
   an information broker validly coupled to the publisher arranged to receive the published event;
   a content filter coupled to the information broker; and
   a subscriber arranged to receive a properly subscribed to published event, wherein the information broker determines whether or not the received event is the properly subscribed to event by determining if an event type corresponding to the published event matches a subscription associated with the subscriber, and whether or not an event security level corresponding to the event is verified, and determining whether or not an event content matches the content filter, and whether or not an event authorization is valid such that when the published event's type matches the subscription and when the event security level is verified, and when the event content matches the content filter, and when the event authorization is valid, then the event is the properly subscribed to event.

2. An enterprise computer system as recited in claim 1, wherein the information broker further includes a preprocessor queue that couples the preprocessor to the content filter.

3. An enterprise computer system as recited in claim 2, wherein the enterprise computer system includes a plurality of subscribers.

4. An enterprise computer system as recited in claim 3 wherein each of the subscribers has an associated subscriber queue coupled thereto.

5. A method as recited in claim 1, wherein the enterprise computer system includes a plurality of interconnected information brokers.

6. A method as recited in claim 1, wherein the content filter is an updateable content filter.

7. A method as recited in claim 6, wherein the content filter is updated by a user as needed.

* * * * *